(12) United States Patent
Ushio et al.

(10) Patent No.: US 11,758,254 B2
(45) Date of Patent: Sep. 12, 2023

(54) BLADE OPEN-CLOSE DEVICE AND IMAGING DEVICE

(71) Applicant: NIDEC COPAL CORPORATION, Tokyo (JP)

(72) Inventors: Ryosuke Ushio, Tokyo (JP); Nobuaki Watanabe, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 17/705,389

(22) Filed: Mar. 28, 2022

(65) Prior Publication Data

US 2022/0407991 A1 Dec. 22, 2022

(30) Foreign Application Priority Data

Jun. 22, 2021 (JP) .................. 2021-103467

(51) Int. Cl.
*H04N 23/55* (2023.01)
*H04N 23/51* (2023.01)
(52) U.S. Cl.
CPC ............. *H04N 23/55* (2023.01); *H04N 23/51* (2023.01)
(58) Field of Classification Search
CPC ........ G03B 17/00; H04N 23/51; H04N 23/55; H04N 23/56
See application file for complete search history.

(56) References Cited

U.S. PATENT DOCUMENTS

| 8,174,609 | B2 | 5/2012 | Sekimoto et al. | |
|---|---|---|---|---|
| 2003/0160889 | A1* | 8/2003 | Angeli | H04N 23/56 348/E5.029 |
| 2004/0258405 | A1* | 12/2004 | Shiratori | G03B 9/14 396/458 |
| 2019/0094655 | A1* | 3/2019 | Ego | H04N 23/51 |
| 2022/0021791 | A1* | 1/2022 | Imai | H04N 23/57 |
| 2022/0182545 | A1* | 6/2022 | Tang | H04N 5/33 |

* cited by examiner

*Primary Examiner* — Amy R Hsu
(74) *Attorney, Agent, or Firm* — HAUPTMAN HAM, LLP

(57) ABSTRACT

A blade open-close device includes a blade for which an open or closed state is easily viewable from outside. A blade open-close device includes a base having a base opening, and a cover covering the base and having a cover opening adjacent to the base opening in the base in Z-direction. The blade open-close device further includes a blade movable in X-direction in a blade chamber between the base and the cover and including a light emitter that emits light, and an actuator that moves the blade to a closing position to expose at least part of the light emitter in the blade through the cover opening and retracts the blade to an opening position to allow the cover opening and the base opening to communicate with each other.

11 Claims, 5 Drawing Sheets

BLADE OPEN-CLOSE DEVICE AND IMAGING DEVICE

RELATED APPLICATIONS

The present application claims priority to Japanese Application Number 2021-103467, filed Jun. 22, 2021, the disclosure of which is hereby incorporated by reference herein in its entirety.

BACKGROUND

Technical Field

The present invention relates to a blade open-close device and an imaging device, and particularly, to a blade open-close device for covering and uncovering an opening with a blade.

Description of the Background

Recent electronic devices, such as smartphones, smart speakers, and drones, incorporate cameras. Such a camera typically has a lens aperture constantly uncovered, or being constantly ready for image capturing. In this state, the camera may be operated by a malicious third party, possibly capturing images or videos unintended by the user. Such images or videos can be used for crime.

In particular, electronic devices incorporating cameras are now often connected to a network such as the Internet. The connected electronic devices may be operated remotely by a malicious program without being noticed by the user. When the electronic device is operated remotely, image capturing may be performed without being noticed by the user, possibly allowing the camera to capture images or videos for transmission to external devices. For privacy protection of the user, structures are awaited for shielding against image capturing with a camera when unintended by the user.

Such structures for preventing image capturing with a camera may include a known camera shutter that opens and closes a blade between a lens and a subject (refer to, for example, Patent Literature 1). However, the camera shutter may not fit in an electronic device that is smaller and has a limited space for a camera module. The blade also tends to be smaller for a smaller electronic device. The state of such a smaller blade that is either open or closed is difficult to determine from outside. The user comfort regarding privacy protection may be difficult to increase.

CITATION LIST

Patent Literature

Patent Literature 1: Japanese Unexamined Patent Application Publication No. 2009-288327

BRIEF SUMMARY

In response to the above issue, one aspect of the present invention is directed to a blade open-close device including a blade for which an open or closed state is easily viewable from outside.

Another aspect of the present invention is directed to an imaging device that can increase the user comfort regarding privacy protection.

A blade open-close device according to one aspect of the present invention includes a blade for which an open or closed state is easily viewable from outside. The blade open-close device includes a base having a base opening, and a cover covering at least part of the base. The cover has a cover opening adjacent to the base opening in the base in a first direction. The blade open-close device further includes a blade movable in a second direction perpendicular to the first direction in a blade chamber defined between the base and the cover. The blade includes a light emitter that emits light. The blade open-close device includes an actuator that moves the blade to a closing position to expose at least part of the light emitter in the blade through the cover opening and retracts the blade to an opening position to allow the cover opening and the base opening to communicate with each other.

DETAILED DESCRIPTION

Figure 1:
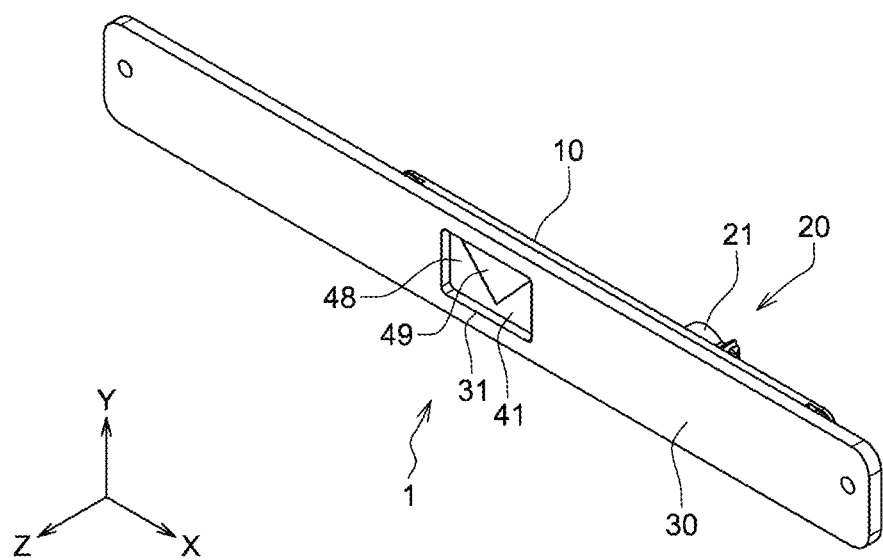
FIG. 1 is a perspective view of a blade open-close device according to one embodiment of the present invention.

A blade open-close device according to one or more embodiments of the present invention will now be described in detail with reference to FIGS. 1 to 6. In FIGS. 1 to 6, the same or corresponding components are given the same reference numerals and will not be described repeatedly. In FIGS. 1 to 6, the scale and dimensions of each component may be exaggerated, or one or more components may not be shown. Unless otherwise specified, the terms such as first and second will be used simply to distinguish the components and will not represent a specific order or sequence.

Figure 2:
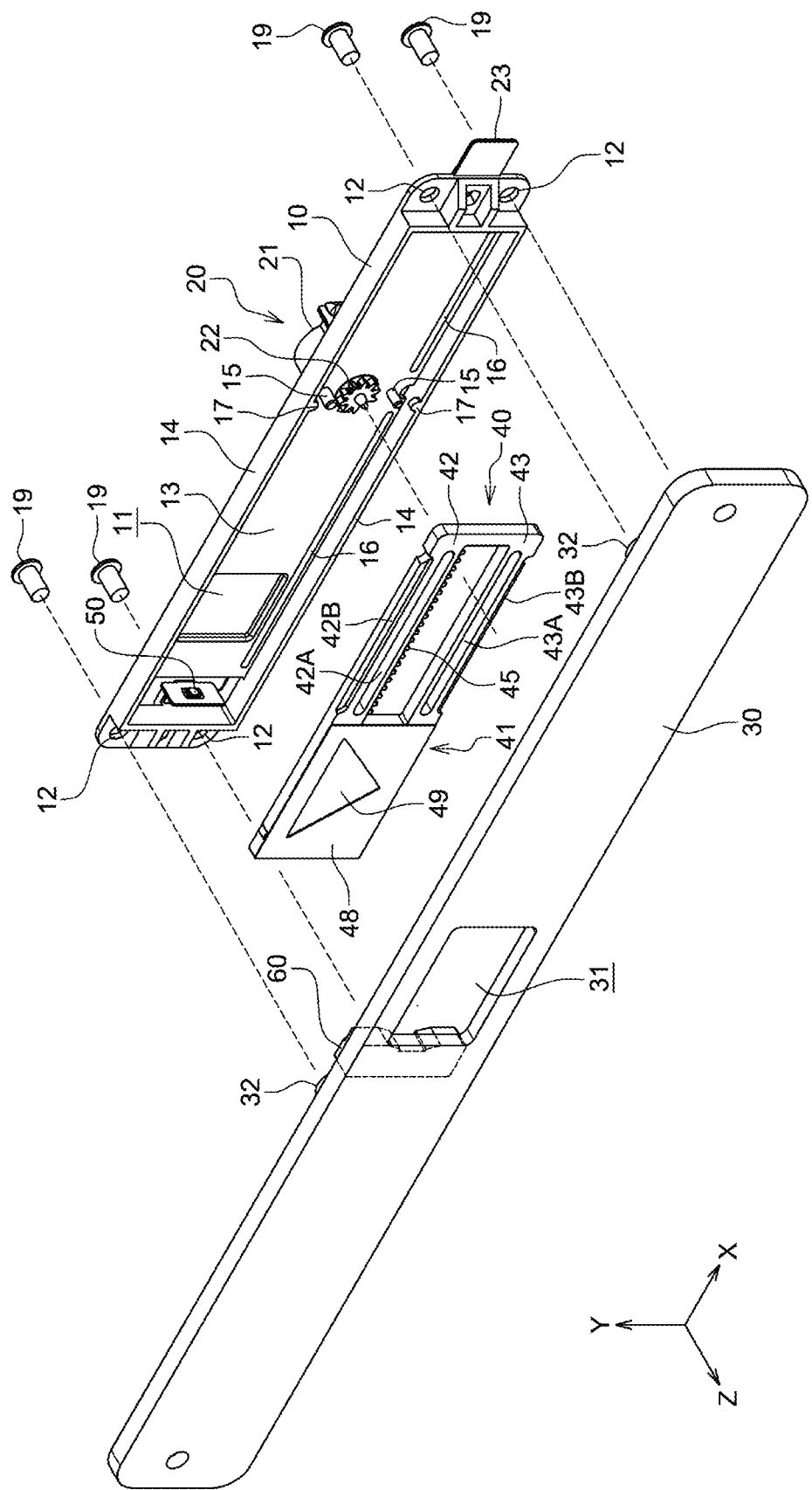
FIG. 2 is an exploded perspective view of the blade open-close device shown in FIG. 1.

FIG. 1 is a perspective view of a blade open-close device 1 according to one embodiment of the present invention. FIG. 2 is an exploded perspective view of the blade open-close device 1. As shown in FIGS. 1 and 2, the blade open-close device 1 includes a base 10 having a substantially rectangular base opening 11, an actuator 20 attached to the base 10, a cover 30 entirely covering the base 10, and a blade 40 in a blade chamber defined between the base 10 and the cover 30. The blade open-close device 1 is incorporated in a camera unit for, for example, preventing image capturing with a camera when unintended by the user. For example, the blade open-close device 1 is incorporated in a camera unit (imaging device) incorporated in a television or a laptop personal computer.

The base 10 and the cover 30 are arranged side by side in a direction (Z-direction) along an optical axis of the camera unit. The cover 30 has a substantially rectangular cover opening 31 adjacent to the base opening 11 in the base 10 in the Z-direction (first direction). A lens module of a camera unit (not shown) is located in the negative Z-direction from the base opening 11 in the base 10. Light enters a lens in the lens module and an image sensor through the cover opening 31 and the base opening 11. The base opening 11 in the base 10 functions as an opening (aperture) that determines the amount of light entering the lens module.

The base 10 has through-holes 12 in its four corners. The through-holes 12 receive screws 19. The screws 19 are screwed with threads 32 on the cover 30 to fasten the base 10 and the cover 30 with each other. The base 10 and the cover 30 may be fastened in a different manner.

The actuator 20 includes a motor 21 such as a stepping motor, a flat motor, and a direct-current (DC) motor, and a pinion 22 connected to an output shaft of the motor 21. The motor 21 is connected to an external controller through a flexible printed circuit (FPC) 23. The motor 21 is driven to rotate the pinion 22 about a Z-axis in response to a control signal from the controller.

Figure 3:
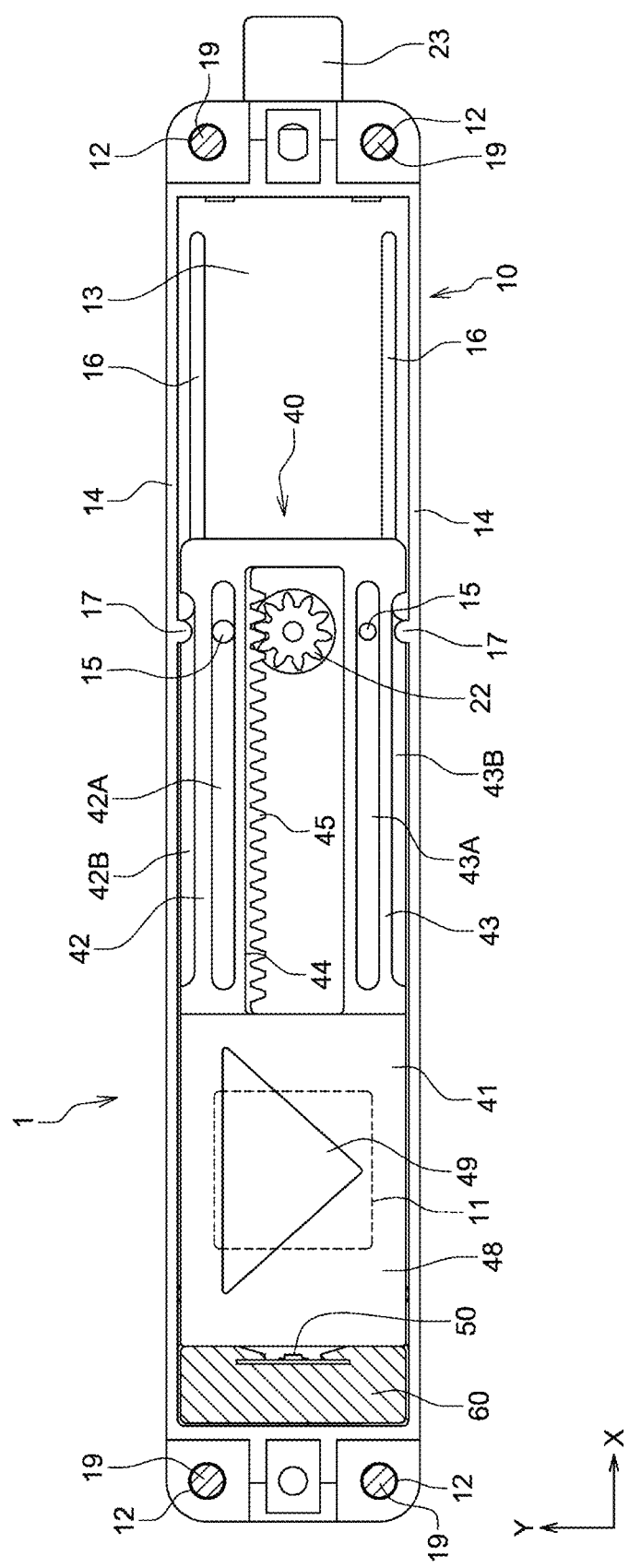
FIG. 3 is a front view of the blade open-close device in FIG. 1 resulting from cutting the device between a base and a cover.

FIG. 3 is a front view of the blade open-close device 1 in FIG. 1 resulting from cutting the device between the base 10 and the cover 30. As shown in FIG. 3, the blade 40 includes a light emitter 41 that can cover the cover opening 31 and the base opening 11, a pair of guides 42 and 43 extending from the light emitter 41 in the positive X-direction, and a rack 45 extending in the X-direction on a surface 44 of the guide 42 of the surfaces of the guides 42 and 43 facing each other. The blade 40 is, for example, a light-transmissive light guide plate. The light emitter 41 has a surface on which a light-shielding coating 48 is partially applied. This defines, in a central portion of the light emitter 41 in the blade 40, an inverted triangular light-emissive area 49 with no coating 48.

The rack 45 meshes with the pinion 22 in the actuator 20. The guide 42 has a guide groove 42A extending in the X-direction. The guide 43 has a guide groove 43A extending in the X-direction. The guide 42 has, in the positive Y-direction from the guide groove 42A, a guide recess 42B extending in the X-direction. The guide 43 has, in the negative Y-direction from the guide groove 43A, a guide recess 43B extending in the X-direction.

The base 10 includes a plate 13 having the base opening 11, side walls 14 extending in the positive Z-direction from the two edges of the plate 13 in the Y-direction, guide posts 15 protruding from the plate 13 in the positive Z-direction, and rails 16 extending in the X-direction on the plate 13. The blade 40 is between the side walls 14 of the base 10. The side walls 14 of the base 10 each have a protrusion 17. The protrusions 17 protrude in directions (inwardly) in which they face each other.

The guide posts 15 in the base 10 are each placed in the guide grooves 42A and 43A in the blade 40. The guide posts 15 have an outer diameter slightly smaller than the width of the guide grooves 42A and 43A in the blade 40 in the Y-direction. The guide posts 15 are movable in the X-direction in the guide grooves 42A and 43A while engaging with the guide grooves 42A and 43A in the blade 40. The protrusions 17 on the base 10 are each placed in the guide recesses 42B and 43B in the blade 40 and are movable in the X-direction in the guide recesses 42B and 43B. In this manner, the blade 40 is movable in the X-direction (second direction) in the blade chamber defined between the base 10 and the cover 30 while being guided by the side walls 14 of the base 10 and the guide posts 15. The blade 40 slides along the rails 16 in the base 10 as it moves in the X-direction.

In the state shown in FIGS. 1 and 3, the light emitter 41 in the blade 40 covers the cover opening 31 and the base opening 11. The light emitter 41 is partially exposed outside through the cover opening 31. The position of the blade 40 in this state is hereafter referred to as a closing position. As described above, the blade 40 at the closing position covers the cover opening 31. The camera unit in operation thus cannot capture images or videos. This prevents images or videos unintended by the user from being obtained with the camera unit.

Figure 4:
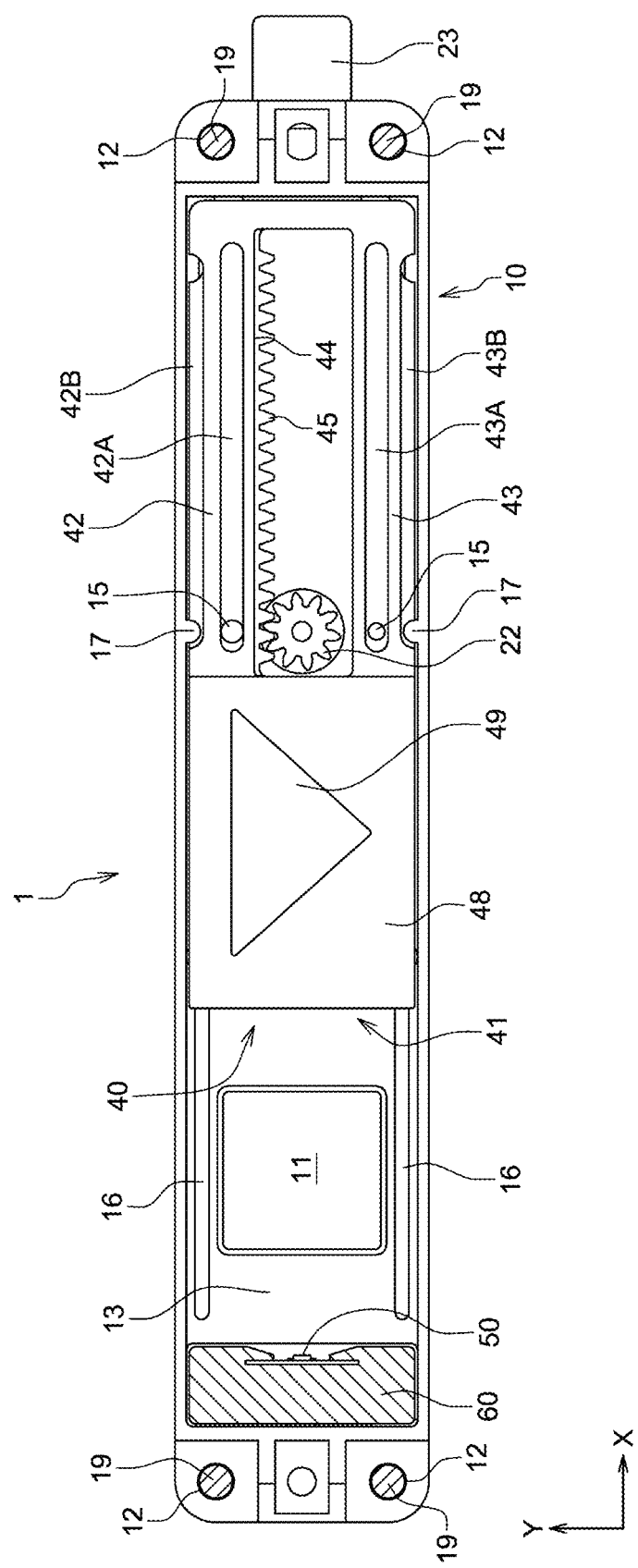
FIG. 4 is a plan view of the blade open-close device with a blade moved in a positive X-direction in the state shown in FIG. 3.

In this state, when the motor 21 in the actuator 20 is driven to rotate the pinion 22 about the Z-axis (clockwise in FIG. 3), the pinion 22 meshing with the rack 45 in the blade 40 moves the blade 40 in the positive X-direction. This state is shown in FIG. 4. The light emitter 41 in the blade 40 in this state is at a position at which the light emitter 41 is retracted from the cover opening 31 and the base opening 11 in the positive X-direction. The position of the blade 40 in this state is hereafter referred to as an opening position. In this state, the cover opening 31 and the base opening 11 communicate with each other. This allows external light to enter the lens and the image sensor in the camera unit through the cover opening 31 and the base opening 11, thus allowing image capturing with the camera unit.

In the state shown in FIG. 4, when the motor 21 in the actuator 20 is driven to rotate the pinion 22 in a direction opposite to the above direction, the pinion 22 meshing with the rack 45 in the blade 40 moves the blade 40 in the negative X-direction to the closing position shown in FIG. 3. In this manner, the actuator 20 drives the motor 21 to rotate the pinion 22, thus allowing the blade 40 to move between the closing position and the opening position with the pinion 22 meshing with the rack 45 in the blade 40.

A light-emitting diode (LED) light source 50 is adjacent to the light emitter 41 in the blade 40 at the closing position in FIG. 3. The FPC 23 described above extends to the LED light source 50 and connects the LED light source 50 to the external controller. The LED light source 50 thus emits light in response to a signal from the controller. The LED light source 50 is held by a holder 60 included in the cover 30.

Figure 5:
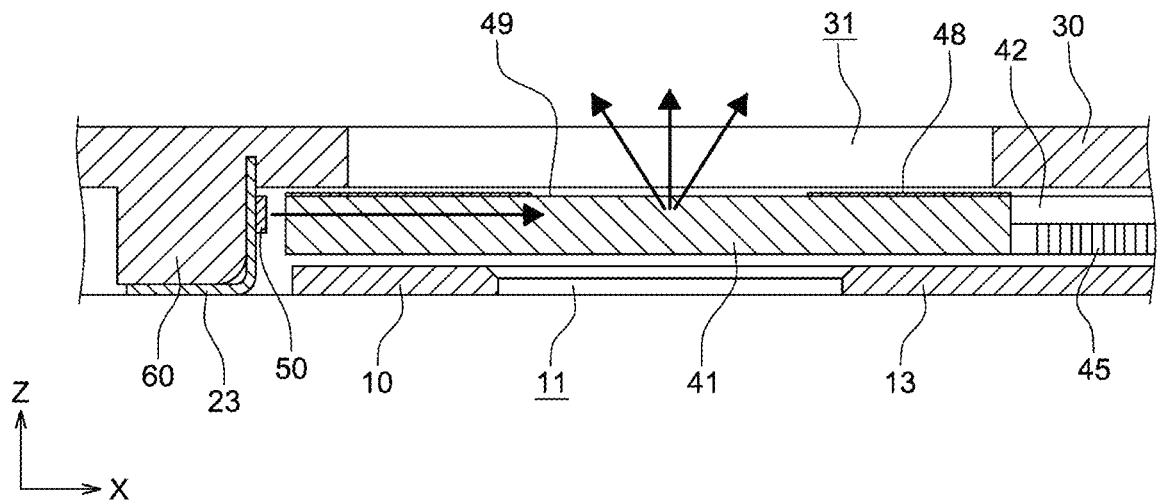
FIG. 5 is a partial cross-sectional view of the blade open-close device shown in FIG. 3.

FIG. 5 is a partial cross-sectional view of the blade open-close device 1 shown in FIG. 3. As described above, the blade 40 is, for example, a light-transmissive light guide plate. Light from the LED light source 50 enters the light emitter 41 through the side surface of the blade 40 and travels through the light emitter 41 as indicated by an arrow in FIG. 5. Light traveling through the light emitter 41 is emitted outside from the light-emissive area 49 on which the light-shielding coating 48 is not applied through the cover opening 31. In other words, the light emitter 41 in the blade 40 in the present embodiment receives light from the LED light source 50 to emit light outside.

In the present embodiment, as described above, the LED light source 50 emits light, allowing the inverted triangular light-emissive area 49 in the light emitter 41 to emit light through the cover opening 31. The state of the cover opening 31 being covered by the blade 40 in the blade open-close device 1 is thus easily viewable from outside. The light-emissive area 49 may be in a shape other than an inverted triangle. For example, the light-emissive area 49 may be circular, elliptical, or rectangular. The light-emissive area 49 may also include a mark indicating, for example, a specific figurative trademark or design. The light-emissive area 49 may include a character string, or may be a combination of the mark described above and a character string.

In the present embodiment, the blade open-close device 1 is shorter in the Y-direction and longer in the X-direction. The LED light source 50 is located opposite to the actuator 20 from the base opening 11 in the X-direction. To allow light from the LED light source 50 to efficiently enter the light emitter 41 in the blade 40, the LED light source 50 may be adjacent to the center of the light emitter 41 in the blade 40 at the closing position in the Y-direction (third direction) as shown in FIG. 3. To allow more light to enter the light emitter 41 in the blade 40, the LED light source 50 may have its thickness in the Z-direction within the thickness of the light emitter 41 in the blade 40 in the Z-direction as shown in FIG. 5.

Figure 6:
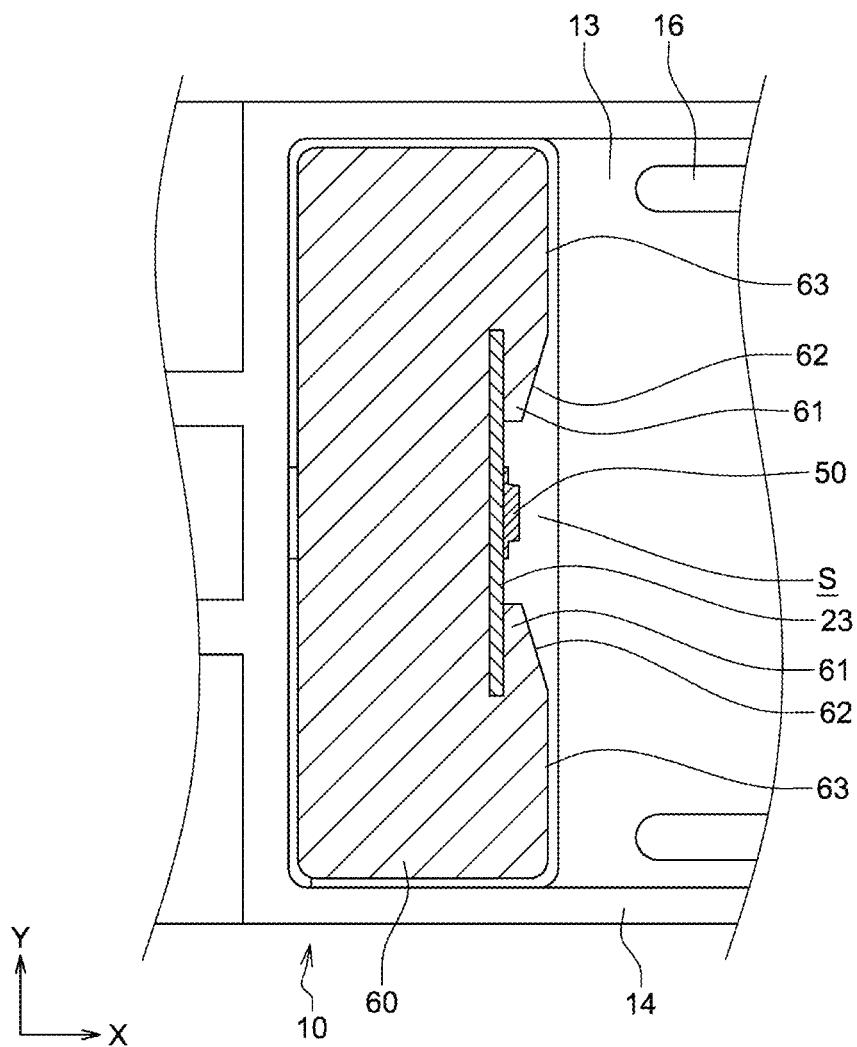
FIG. 6 is a partially enlarged view of the blade open-close device in FIG. 4.

FIG. 6 is a partially enlarged view of the blade open-close device 1 in FIG. 4. As described above, the LED light source 50 is held by the holder 60 in the cover 30. As shown in FIG. 6, the holder 60 in the cover 30 includes grippers 61 for holding the FPC 23 to which the LED light source 50 is connected. The grippers 61 each have an inclined surface 62 defining an illumination space S that gradually widens from the LED light source 50 toward the light emitter 41 in the blade 40 and a stopper surface 63 that can come in contact with the blade 40. The inclined surfaces 62 of the grippers 61 defining the illumination space S that gradually widens from the LED light source 50 toward the light emitter 41 allow light from the LED light source 50 to enter through a wider area of the light emitter 41. This directs light from the LED light source 50 to the light emitter 41 more efficiently. The stopper surfaces 63 of the grippers 61 receive the blade 40 moving in the negative X-direction, thus restricting the blade 40 from moving farther from the stopper surfaces 63 in the negative X-direction.

Although the holder 60 holding the LED light source 50 is included in the cover 30 in the present embodiment, the holder 60 may be included in the base 10.

Although the entire blade 40 is a light-transmissive light guide plate in the present embodiment, the blade 40 with the light emitter 41 being a light guide plate may have other parts being other than a light guide plate. The surface of the light emitter 41 may not have the coating 48. In the present embodiment, light from the LED light source 50 is directed to the light emitter 41 in the blade 40 to emit light from the light emitter 41. However, for example, the LED light source 50 may be eliminated and at least part of the light emitter 41 may be formed from a luminous material or a fluorescent material to emit light.

Although the base opening 11 in the base 10 and the cover opening 31 in the cover 30 are substantially rectangular in the illustrated embodiment, the base opening 11 and the cover opening 31 may be of any shapes and may be, for example, circular or elliptical, rather than being substantially rectangular.

In another embodiment, the blade 40 may be open or closed manually. In this case, the camera unit may be powered on or off in accordance with the open or closed state of the blade 40. For example, the camera unit may be powered on when the blade 40 is in the open state and may be powered off when the blade 40 is in the closed state.

In still another embodiment, the cover 30 may include a light emitter (e.g., an LED) that changes its emission state to indicate the open or closed state of the blade 40. For example, the light emitter (LED) may emit light when the blade 40 is in the open state and be turned off when the blade 40 is in the closed state. The light emitter may change the color of light emission in accordance with the state change of the blade 40 between the open state and the closed state, rather than emitting light or being turned off. The light emitter may be located inside the cover 30 (or in other words, in the negative Z-direction). For example, when the light emitter emits light, the light from the light emitter may be viewable from outside through the cover 30. The user can thus notice at least part of the cover 30 seemingly emitting light.

As described above, the blade open-close device 1 according to the present embodiment is incorporated in a camera unit (imaging device) incorporated in a television or a laptop personal computer. The blade open-close device 1 allows light passing through the cover opening 31 in the cover 30 and the base opening 11 in the base 10 to enter an image sensor in the imaging device. In this case, the cover 30 in the blade open-close device 1 may also serve as a cover member in the imaging device.

As described above, a blade open-close device according to a first aspect of the present invention includes a blade for which an open or closed state is easily viewable from outside. The blade open-close device includes a base having a base opening, and a cover covering at least part of the base. The cover has a cover opening adjacent to the base opening in the base in a first direction. The blade open-close device further includes a blade movable in a second direction perpendicular to the first direction in a blade chamber defined between the base and the cover. The blade includes a light emitter that emits light. The blade open-close device includes an actuator that moves the blade to a closing position to expose at least part of the light emitter in the blade through the cover opening and retracts the blade to an opening position to allow the cover opening and the base opening to communicate with each other.

In this structure, when the blade moves to the closing position, light is emitted from the light emitter in the blade exposed through the cover opening. The cover opening in the blade open-close device is thus easily viewable from outside as being covered by the blade.

The blade open-close device may further include a light source adjacent to the light emitter in the blade at the closing position. In this case, at least the light emitter in the blade may be formed from a light-transmissive material. The light emitter in the blade may have a surface on which a light-shielding coating is partially applied.

The light source may be located opposite to the actuator from the base opening in the second direction. To allow light from the light source to efficiently enter the light emitter in the blade, the light source may be adjacent to the center of the light emitter in the blade at the closing position in a third direction perpendicular to the first direction and to the second direction. To allow more light to enter the light emitter in the blade, the light source may have a thickness in the first direction within the thickness of the light emitter in the blade in the first direction.

The cover or the base may include a holder for holding the light source. The holder may have an inclined surface defining an illumination space that gradually widens from the light source toward the light emitter in the blade. The illumination space gradually widening toward the light emitter allows light from the light source to enter through a wider area of the light emitter. This directs light from the light source to the light emitter more efficiently.

The holder may further have a stopper surface that can come in contact with the blade. The stopper surface of the holder receives the blade moving in the second direction, thus restricting the blade from moving farther from the stopper surface in the second direction.

The blade may further include a pair of guides extending in the second direction to be guided by the base and a rack on one of the pair of guides in the second direction. In this case, the actuator may include a pinion that meshes with the rack in the blade.

An imaging device according to a second aspect of the present invention can increase the user comfort regarding privacy protection. The imaging device includes an image sensor and the blade open-close device described above. The blade open-close device is located to allow light passing through the cover opening and the base opening to enter the image sensor. In this case, the cover in the blade open-close device may be a cover member in the camera unit including the image sensor.

Although the embodiments of the present invention have been described above, the present invention is not limited to the above embodiments and may be modified variously within the scope of its technical idea.

What is claimed is:

1. A blade open-close device, comprising:
   a base having a base opening;
   a cover covering at least part of the base, the cover having a cover opening adjacent to the base opening in the base in a first direction;
   a blade movable in a second direction perpendicular to the first direction in a blade chamber defined between the base and the cover, the blade including a light emitter configured to emit light; and
   an actuator configured to move the blade to a closing position to expose at least part of the light emitter in the blade through the cover opening and retract the blade to an opening position to allow the cover opening and the base opening to communicate with each other.

2. The blade open-close device according to claim 1, further comprising:
   a light source adjacent to the light emitter in the blade at the closing position,
   wherein at least the light emitter in the blade comprises a light-transmissive material.

3. The blade open-close device according to claim 2, wherein
   the light emitter in the blade has a surface partially coated with a light-shielding coating.

4. The blade open-close device according to claim 2, wherein
   the light source is located opposite to the actuator from the base opening in the second direction.

5. The blade open-close device according to claim 2, wherein
   the light source is adjacent to a center of the light emitter in the blade at the closing position in a third direction perpendicular to the first direction and to the second direction.

6. The blade open-close device according to claim 2, wherein
   the light source has a thickness in the first direction within a thickness of the light emitter in the blade in the first direction.

7. The blade open-close device according to claim 2, wherein
   the cover or the base includes a holder holding the light source, and the holder has an inclined surface defining an illumination space gradually widening from the light source toward the light emitter in the blade.

8. The blade open-close device according to claim 7, wherein
   the holder further has a stopper surface configured to come in contact with the blade.

9. The blade open-close device according to claim 1, wherein
   the blade further includes
   a pair of guides extending in the second direction to be guided by the base, and
   a rack on one of the pair of guides in the second direction, and
   the actuator includes a pinion meshing with the rack in the blade.

10. An imaging device, comprising:
    an image sensor; and
    the blade open-close device according to claim 1, the blade open-close device being located to allow light passing through the cover opening and the base opening to enter the image sensor.

11. The imaging device according to claim 10, wherein
    the cover in the blade open-close device includes a cover member in a camera unit including the image sensor.

* * * * *